No. 856,405. PATENTED JUNE 11, 1907.
C. A. JANSON.
SPIRAL GEARING.
APPLICATION FILED MAR. 14, 1906.
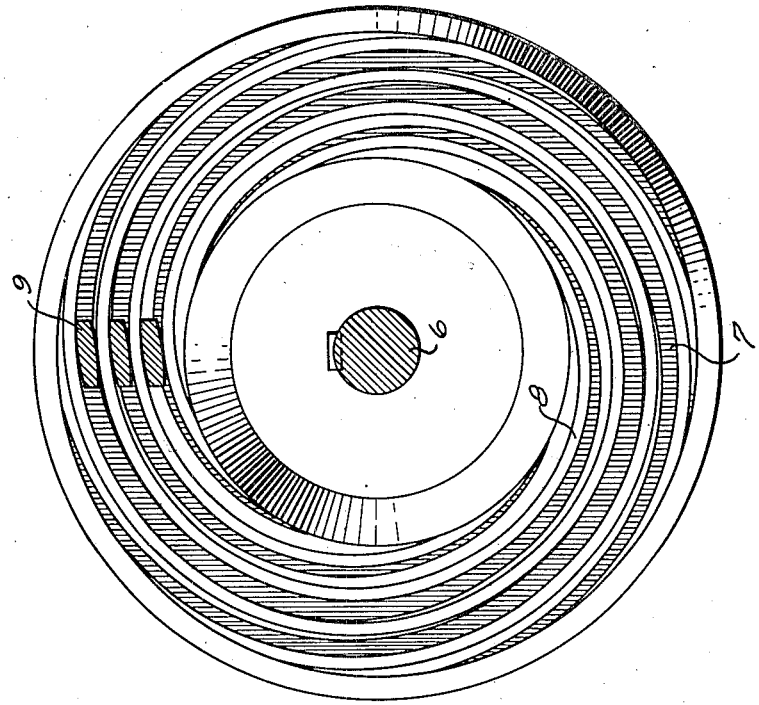
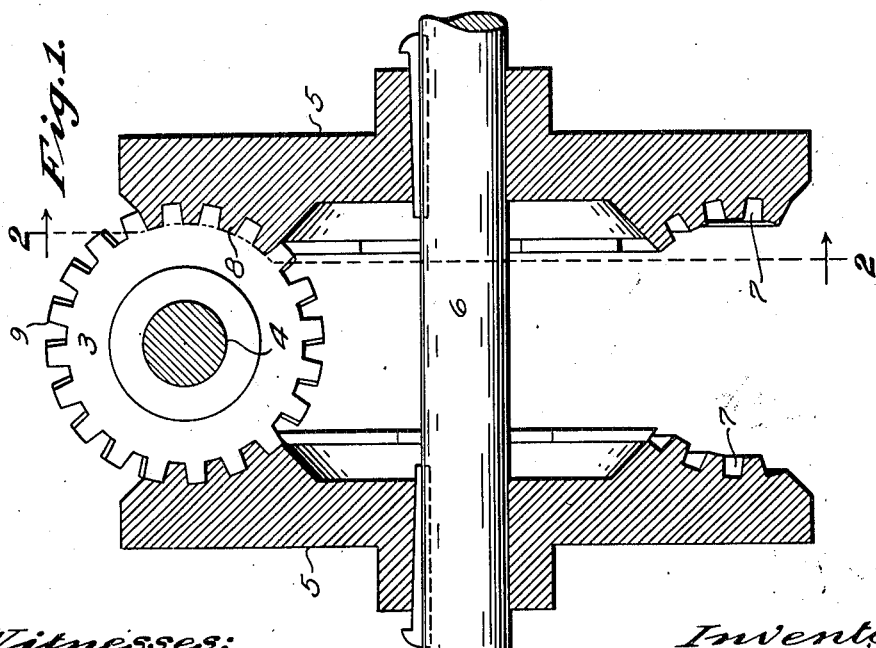

UNITED STATES PATENT OFFICE.

CARL AUG. JANSON, OF CHICAGO, ILLINOIS.

SPIRAL GEARING.

No. 856,405.  Specification of Letters Patent.  Patented June 11, 1907.

Application filed March 14, 1906. Serial No. 305,964.

*To all whom it may concern:*

Be it known that I, CARL AUGUST JANSON, a citizen of the United States of America, and a resident of Chicago, in the county of Cook and State of Illinois, have invented certain new and useful Improvements in Spiral Gearing, of which the following is a specification.

The main object of this invention is to provide an improved form of spiral gearing, which is particularly adapted for transmitting heavy loads with minimum risk of injury to the gearing, which is without blacklash, and in which the strain is spread over a relatively large number of teeth. This object is accomplished by the device shown in the accompanying drawings in which:

Figure 1 is a side elevation partly in section of a form of spiral gearing constructed according to this invention. Fig. 2 is a face view of one of the spiral driving members; showing also a section of the gear wheel, said section being on the line 2—2 of Fig. 1.

In the construction shown in the drawings, the wheel 3 is carried by the shaft 4 and the members 5 are rigidly keyed to a shaft 6 which is disposed at right angles to the shaft 4 and has its axis in the middle plane of the wheel 3. Each of the members 5 consists of an annular wheel or disk having one of its side faces adjacent to the periphery of the wheel 3. The opposed faces of the members 5 each have an annular surface 7 whose curvature fits the adjacent part of the periphery of the wheel 3. The surface 7 is a surface of revolution such as would be formed by rotating the periphery of the wheel 3 about the axis of the shaft 6. The surface 7 thus fits the adjacent part of the periphery of the gear 3 closely in all angular positions of the members 5 when rotated around the axis of the shaft 6.

Each surface 7 has formed thereon a series of spiral threads or ridges 8 whose transverse section is such as to closely fit the spaces between the teeth on the gear 3. Each ridge has a pitch which is a multiple of the pitch of the teeth on the gear 3 and the spacing of the successive spirals also conforms with the pitch of the teeth on the gear 3. The spirals follow the curvature of the surface 7, and are of uniform transverse section throughout their length, except at the extreme ends where they are preferably rounded off. As each spiral exactly fits the space between the adjacent teeth of the wheel 3, there is no backlash. There is no rolling action between the teeth and spirals, and the pressure is therefore never concentrated on the end of a tooth as in ordinary gearing. Opposite faces of the teeth 9 on the wheel 3 are preferably symmetrical with respect to each other since the same face of each tooth has working contact with the convexly curved faces of the spirals on one member 5 and with the concavely curved faces of the spirals on the other member 5.

The members 5 are exactly alike except that they are mounted upon the shafts with their spirally ridged faces opposed to each other and in mesh with opposite sides of the periphery of the wheel 3. Both sets of spirals thus serve to rotate the gear 3 in the same direction and the pressure is at all times evenly distributed over eight teeth of the gear 3, making a structure of great strength. Each spiral, besides following the curvature of the surface 7, is gradually twisted throughout its length so as to exactly conform to the changes of position of the teeth of the gear 3 as the members 5 rotate.

In the operation of the system of gearing shown, power is transmitted from the shaft 6 to the shaft 4. Like worm gearing, this form of spiral gearing is self-locking against being driven from the shaft 4.

What I claim as my invention and desire to secure by Letters Patent is:

1. The combination of a wheel having gear teeth on its periphery, a shaft journaled on an axis which is at right angles to the axis of said wheel and lies in the plane of said wheel at one side of its axis, two members rigidly mounted on said shaft at opposite sides of said wheel and each having one face adjacent to the periphery of the wheel and having on said face a spiral ridge meshing with the teeth on said wheel, the ridges on said members being alike and being adapted to cause said wheel to rotate through the rotation of said shaft.

2. The combination of a wheel having gear teeth on its periphery, a shaft journaled on an axis which is at right angles to the axis of said wheel and lies in the plane of said wheel at one side of its axis, two members rigidly mounted on said shaft at opposite sides of said wheel and each having one face adjacent to the periphery of the wheel and having on said face a series of spiral ridges meshing with the teeth on said wheel, the ridges on each member being spaced to mesh with the spaces between the teeth of said wheel and the pitch of said ridges being a multiple of the pitch of teeth.

Signed at Chicago this 8th day of March, 1906.

C. AUG. JANSON.

Witnesses:
E. A. RUMMLER,
L. A. SMITH.